(12) United States Patent
Petrovic et al.

(10) Patent No.: US 12,272,799 B2
(45) Date of Patent: Apr. 8, 2025

(54) BATTERY MODULE SUPPORTING AUTOMATED LOW-VOLTAGE CHARGING

(71) Applicant: SCHNEIDER ELECTRIC IT CORPORATION, Foxboro, MA (US)

(72) Inventors: Luka Petrovic, North Billerica, MA (US); Sheng-Hsien Fang, New Taipei (TW)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 656 days.

(21) Appl. No.: 17/651,343

(22) Filed: Feb. 16, 2022

(65) Prior Publication Data

US 2022/0263142 A1      Aug. 18, 2022

Related U.S. Application Data

(60) Provisional application No. 63/150,842, filed on Feb. 18, 2021.

(51) Int. Cl.
*H01M 10/42* (2006.01)
*H02J 7/00* (2006.01)

(52) U.S. Cl.
CPC ... *H01M 10/4257* (2013.01); *H01M 10/4207* (2013.01); *H01M 2010/4271* (2013.01)

(58) Field of Classification Search
CPC .................................................. H02J 7/00036
USPC .......................................................... 320/137
See application file for complete search history.

(56) References Cited

U.S. PATENT DOCUMENTS

| | | |
|---|---|---|
| 8,450,975 B2 | 5/2013 | Kim |
| 9,553,301 B2 | 1/2017 | Amiruddin et al. |
| 10,622,816 B2 | 4/2020 | Stewart et al. |
| 2012/0022708 A1 | 1/2012 | Higuchi et al. |
| 2014/0167700 A1 | 6/2014 | Chen et al. |
| 2016/0134160 A1 | 5/2016 | Schultz et al. |
| 2019/0064907 A1 | 2/2019 | Kurian et al. |

OTHER PUBLICATIONS

Extended European Search Report from corresponding European Application No. 22157435.3 dated Jul. 20, 2022.

*Primary Examiner* — Edward Tso
*Assistant Examiner* — Ahmed H Omar
(74) *Attorney, Agent, or Firm* — Lando & Anastasi, LLP

(57) ABSTRACT

Aspects of the disclosure include a battery module is provided comprising battery terminals configured to be coupled to at least one power device, one or more battery cells configured to store energy, and a battery-management system configured to determine whether a command to operate with the at least one power device has been received, charge, responsive to determining that a command to operate with a first power device has not been received, the one or more battery cells to a first state of charge with power derived from the first power device, and charge, responsive to determining that a command to operate with a second power device has been received, the one or more battery cells to a second state of charge with power derived from the second power device, the second state of charge being greater than the first state of charge.

20 Claims, 5 Drawing Sheets

BATTERY MODULE SUPPORTING AUTOMATED LOW-VOLTAGE CHARGING

CROSS-REFERENCE TO RELATED APPLICATIONS

This application claims priority under 35 U.S.C. § 119(e) to U.S. Provisional Application Ser. No. 63/150,842, titled "BATTERY MODULE SUPPORTING AUTOMATED LOW-VOLTAGE CHARGING," filed on Feb. 18, 2021, which is hereby incorporated by reference in its entirety.

BACKGROUND

1. Field of the Disclosure

At least one example in accordance with the present disclosure relates generally to energy-storage devices.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a battery module is provided comprising battery terminals configured to be coupled to at least one power device, one or more battery cells configured to store energy, and a battery-management system configured to determine whether a command to operate with the at least one power device has been received, charge, responsive to determining that a command to operate with a first power device has not been received, the one or more battery cells to a first state of charge with power derived from the first power device, and charge, responsive to determining that a command to operate with a second power device has been received, the one or more battery cells to a second state of charge with power derived from the second power device, the second state of charge being greater than the first state of charge.

In some examples, the command to operate with the second power device is received from the second power device and includes a command to enter a normal mode of operation. In various examples, the battery-management system is further configured to enter, responsive to receiving the command to enter the normal mode of operation, the normal mode of operation, and control, in the normal mode of operation, the one or more battery cells to discharge power to the second power device. In at least one example, the battery-management system is configured to control the battery module to be in a sleep mode of operation, and receive, in the sleep mode of operation, a wake-up signal from the at least one power device, wherein the battery-management system is configured to determine, responsive to receiving the wake-up signal, whether the command to operate with the at least one power device has been received.

In some examples, the battery-management system is further configured to determine, responsive to receiving the wake-up signal from the at least one power device, whether a voltage provided by the at least one power device across the battery terminals is within an acceptable voltage range. In various examples, the battery-management system is configured to determine that the one or more battery cells are not to be charged responsive to determining that the voltage provided by the at least one power device across the battery terminals is not between the acceptable voltage range. In at least one example, the battery-management system is further configured to determine a voltage provided by the first power device across the battery terminals, and discontinue, responsive to determining that the voltage provided by the first power device across the battery terminals is not within an acceptable voltage range, charging the one or more battery cells to the first state of charge.

In some examples, the battery-management system is further configured to control the battery module to enter the sleep mode of operation responsive to determining that the voltage provided by the first power device across the battery terminals is not within an acceptable voltage range. In various examples, the battery-management system is further configured to determine, responsive to receiving the wake-up signal from the at least one power device, a present state of charge of the one or more battery cells, determine, responsive to determining that a command to operate with the first power device has not been received, whether the present state of charge of the one or more battery cells exceeds the first state of charge, and determine that the one or more battery cells are not to be charged responsive to determining that the present state of charge of the one or more battery cells exceeds the first state of charge. In at least one example, the battery-management system is further configured to determine, subsequent to determining that the present state of charge of the one or more battery cells exceeds the first state of charge, whether a state of charge of the one or more battery cells falls below a third state of charge, and control, responsive to determining that the state of charge of the one or more battery cells falls below the third state of charge, the battery module to be in the sleep mode of operation.

According to various examples of the disclosure, a non-transitory computer-readable medium storing thereon sequences of computer-executable instructions for operating a battery module comprising battery terminals configured to be coupled to at least one power device, and one or more battery cells configured to store energy are provided, the sequences of computer-executable instructions including instructions that instruct at least one processor to determine whether a command to operate with the at least one power device has been received, charge, responsive to determining that a command to operate with a first power device has not been received, the one or more battery cells to a first state of charge with power derived from the first power device, and charge, responsive to determining that a command to operate with a second power device has been received, the one or more battery cells to a second state of charge with power derived from the second power device, the second state of charge being greater than the first state of charge.

In some examples, the command to operate with the second power device is received from the second power device and includes a command to enter a normal mode of operation. In various examples, the instructions further instruct the at least one processor to control the battery module to enter, responsive to receiving the command to enter the normal mode of operation, the normal mode of operation, and control, in the normal mode of operation, the one or more battery cells to discharge power to the second power device. In at least one example, the instructions further instruct the at least one processor to control the battery module to be in a sleep mode of operation, and receive, in the sleep mode of operation, a wake-up signal from the at least one power device, wherein the instructions instruct the at least one processor to determine, responsive to receiving the wake-up signal, whether the command to operate with the at least one power device has been received.

In some examples, the instructions further instruct the at least one processor to determine, responsive to receiving the wake-up signal from the at least one power device, whether a voltage provided by the at least one power device across the battery terminals is within an acceptable voltage range. In various examples, the instructions further instruct the at least one processor to determine that the one or more battery cells are not to be charged responsive to determining that the voltage provided by the at least one power device across the battery terminals is not between the acceptable voltage range. In at least one example, the instructions further instruct the at least one processor to determine a voltage provided by the first power device across the battery terminals, and discontinue, responsive to determining that the voltage provided by the first power device across the battery terminals is not within an acceptable voltage range, charging the one or more battery cells to the first state of charge.

In some examples, the instructions further instruct the at least one processor to determine, responsive to receiving the wake-up signal from the first power device, a present state of charge of the one or more battery cells, determine, responsive to determining that a command to operate with the first power device has not been received, whether the present state of charge of the one or more battery cells exceeds the first state of charge, and determine that the one or more battery cells are not to be charged responsive to determining that the present state of charge of the one or more battery cells exceeds the first state of charge. In various examples, the instructions further instruct the at least one processor to determine, subsequent to determining that the present state of charge of the one or more battery cells exceeds the first state of charge, whether a state of charge of the one or more battery cells falls below a third state of charge, and control, responsive to determining that the state of charge of the one or more battery cells falls below the third state of charge, the battery module to be in the sleep mode of operation.

According to at least one aspect of the disclosure, a method of assembling a battery module is provided, the method comprising providing battery terminals configured to be coupled to at least one power device, providing one or more battery cells configured to store energy, and providing a battery-management system configured to determine whether a command to operate with the at least one power device has been received, charge, responsive to determining that a command to operate with a first power device has not been received, the one or more battery cells to a first state of charge with power derived from the first power device, and charge, responsive to determining that a command to operate with a second power device has been received, the one or more battery cells to a second state of charge with power derived from the second power device, the second state of charge being greater than the first state of charge, coupling the battery terminals to the one or more battery cells, and coupling the battery-management system to the one or more battery cells.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
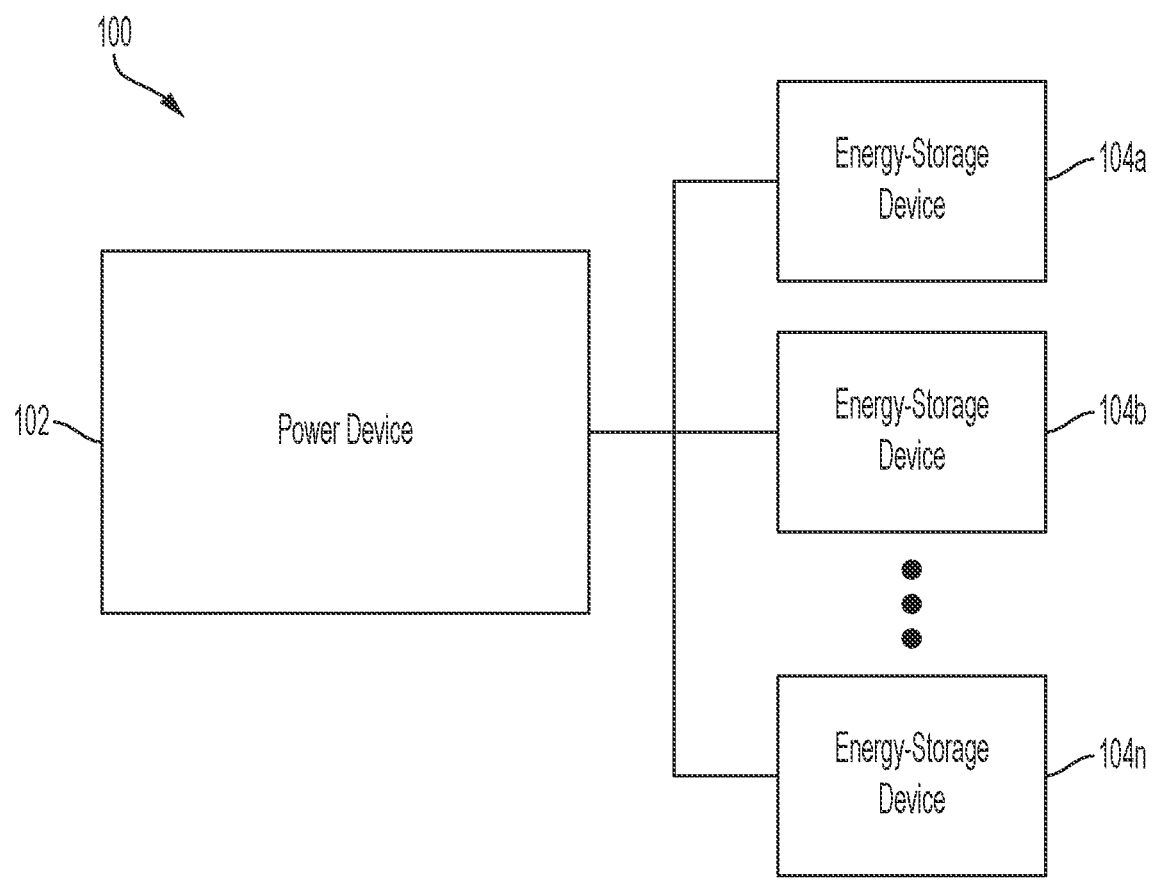
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Energy-storage devices such as batteries may store energy to discharge to a load. For example, an energy-storage device may discharge stored energy to an uninterruptible power supply (UPS) that may be capable of providing uninterrupted power to a load. Some energy-storage devices may be charged to a desired energy level, or state of charge (SOC).

An amount of energy stored by an energy-storage device may be expressed as a percentage of the energy-storage device's full state of charge. For example, if an energy-storage device currently stores an amount of energy that is half of an amount of energy that the energy-storage device is capable of storing, then an SOC of the energy-storage device may be 50%.

While an energy-storage device is in normal operation, it may be advantageous to charge the energy-storage device to approximately 100% SOC if charging power is available. For example, when an energy-storage device is coupled to a UPS, it may be advantageous for the UPS to charge the energy-storage device to approximately 100% SOC if charging power is available.

When an energy-storage device is not in operation, however, it may be desirable to impose a maximum SOC on the energy-storage device. For example, regulatory agencies may impose a maximum SOC (for example, 30%) on energy-storage devices while the energy-storage devices are in transit. It may also be desirable to impose a maximum SOC on energy-storage devices while the energy-storage devices are being stored for distribution. It may also be desirable to impose a minimum SOC on the energy-storage devices to promote energy-storage-device health. Accordingly, energy-storage devices may be occasionally recharged by a power device while in storage to maintain the energy-storage devices within a desired SOC range (for example, 25-30% SOC).

It may therefore be advantageous for an energy-storage device to be able to determine a maximum-SOC limit such that, when the energy-storage device is capable of recharging, the energy-storage device remains within a desired SOC range. In one example, a maximum-SOC limit may be determined based on a power device to which an energy-storage device is coupled. As discussed below, a type of power device that the energy-storage device is being connected to may be indicative of whether a maximum-SOC limit should be imposed.

A power device may be a device that can exchange power with an energy-storage device. Exchanging power may include providing power to, or receiving power from, the energy-storage device. If the power device is one that the energy-storage device is configured to operate normally with, such as a UPS, then a maximum-SOC limit may be approximately 100% (or, stated differently, a maximum-SOC limit may be removed). As used herein, an energy-storage device may be considered to "operate with" a power device if the energy-storage device discharges power to the power device, whether or not the power device provides charging power to the energy-storage device.

If the power device is not one that the energy-storage device is configured to operate with, such as a charging device used in a warehouse or other storage facility, then a lower maximum-SOC limit may be implemented (for example, approximately 30%). Examples disclosed herein therefore enable an energy-storage device to dynamically determine a maximum-SOC limit based at least in part on a type of power device to which the energy-storage device is connected, which may be indicative of an environment that the energy-storage device is implemented in.

Current energy-storage-device systems may require specialized knowledge by certain individuals, such as workers in shipping facilities, to maintain energy-storage-devices at acceptable levels of charge, for example, prior to shipping. Such energy-storage-device systems may operate inefficiently because workers may be required to have specialized knowledge and opportunities for human error can be introduced. Moreover, specialized equipment may be necessary to be able to charge energy-storage-device systems to no higher than a low state-of-charge, for example, no higher than a state-of-charge that is less than a maximum physical capacity of the energy-storage-device system. This is a technical problem. An exemplary embodiment of a battery module is provided comprising battery terminals configured to be coupled to at least one power device, one or more battery cells configured to store energy, and a battery-management system configured to determine whether a command to operate with the at least one power device has been received, charge, responsive to determining that a command to operate with a first power device has not been received, the one or more battery cells to a first state of charge with power derived from the first power device, and charge, responsive to determining that a command to operate with a second power device has been received, the one or more battery cells to a second state of charge with power derived from the second power device, the second state of charge being greater than the first state of charge.

At least this foregoing combination of features comprises an energy-storage-device system that serves as a technical solution to the foregoing technical problem. This technical solution is not routine and is unconventional. This technical solution is a practical application of the battery-module-system design that solves the foregoing technical problem and constitutes an improvement in the technical field of energy storage devices at least by facilitating a battery module's ability to automatically maintain an appropriate charge level.

FIG. 1 illustrates a block diagram of a power system 100 according to an example. The power system 100 includes a power device 102 and an arbitrary number of energy-storage devices 104 ("energy-storage devices 104"), which may include one, two, three, or more energy-storage devices. The power device 102 is coupled to each of the energy-storage devices 104, which may include electrical, physical, and/or communicative couplings.

The power device 102 may include any device capable of exchanging power with (for example, providing power to and/or receiving power from) the energy-storage devices 104. In one example, the power device 102 may be a UPS configured to exchange power with the energy-storage devices 104. An example of a UPS is provided below with respect to FIG. 5.

In another example, the power device 102 may be a recharging device configured to provide recharging power to the energy-storage devices 104. For example, the power system 100 may be implemented in an energy-storage-device storage facility, such as a warehouse. It may be advantageous to periodically recharge the energy-storage devices stored in the warehouse, particularly if the devices are stored for a long period of time, to promote energy-storage-device health. The power device 102 may be or include a recharging device operated by a warehouse operator to periodically recharge stored energy-storage devices. In other examples, the power device 102 may be or include any other device configured to exchange power with the energy-storage devices 104.

Each of the energy-storage devices 104 is configured to store energy. For example, the energy-storage devices 104 may include one or more batteries, capacitors, flywheels, or other devices configured to store energy. The energy-storage devices 104 may receive power from, and/or discharge power to, the power device 102 and/or other devices. The energy-storage devices 104 may exchange power with several power devices in addition to the power device 102 simultaneously and/or serially. In some examples, the energy-storage devices 104 may be coupled to one another.

As discussed above, it may be advantageous to charge the energy-storage devices 104 to less than a full SOC in some scenarios. For example, it may be advantageous to maintain the energy-storage devices 104 at less than a full SOC while the energy-storage devices 104 are in storage, transit, or otherwise not being used in active operation. In some examples, the energy-storage devices 104 are configured to select a maximum SOC level based at least in part on what type of device the power device 102 is. The type of device may indicate whether the energy-storage devices 104 are still in storage or are being used in regular operation by a user. For example, if the power device 102 is a UPS, the energy-storage devices 104 are likely being used in regular operation rather than being held in storage. The maximum SOC may thus be adjusted based on a type of device that the power device 102 is.

Figure 2:
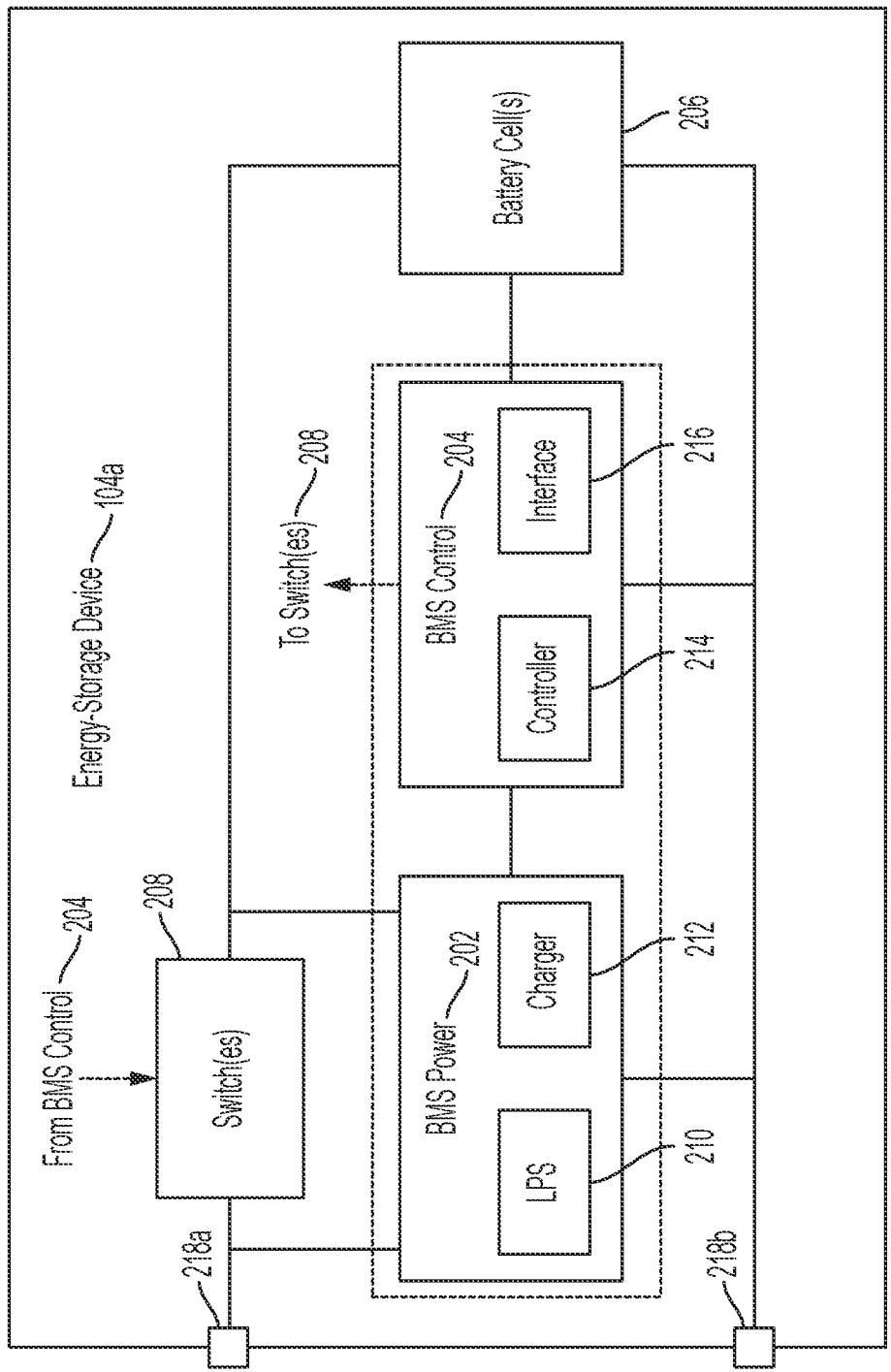
FIG. 2 illustrates a block diagram of an energy-storage device according to an example.

FIG. 2 illustrates a block diagram of an energy-storage device 104a of the energy-storage devices 104 according to an example. It is to be appreciated that FIG. 2 may illustrate an example of any of the energy-storage devices 104. As discussed above, the energy-storage devices 104 may be implemented as one or more batteries, capacitors, flywheels, or other energy-storage devices. For purposes of example, the energy-storage device 104a may be implemented as a battery module having battery-related components. Accordingly, for purposes of example only, the energy-storage device 104a may alternately be referred to as a battery module 104a. It is to be appreciated, however, that the principles of the disclosure are applicable to other types of energy-storage devices.

The battery module 104a includes a battery-management system (BMS) 200 having a BMS-power module 202 and a BMS-control module 204, one or more battery cells 206 ("battery cells 206"), one or more switching devices 208 ("switch 208"), and a first battery terminal 218a and a second battery terminal 218b (collectively, "battery terminals 218"). The BMS-power module 202 includes a logic power supply (LPS) 210 and a charger 212. The BMS-control module 204 includes at least one controller 214 ("controller 214") and at least one interface 216 ("interface 216").

The first battery terminal 218a is coupled to the switch 208 and the BMS-power module 202, and is configured to be coupled to a power device. The second battery terminal 218b is coupled to the BMS-power module 202, the BMS-control module 204, and the battery cells 206, and is configured to be coupled to the power device. For example, the battery terminals 218 may be configured to be coupled to the power device 102, which may be a UPS, a recharging device in a warehouse, or another device configured to exchange power with the battery module 104a.

The switch 208 is coupled to the first battery terminal 218a at a first connection, is coupled to the battery cells 206 at a second connection, and is configured to be communicatively coupled to the BMS-control module 204. The BMS-power module 202 is coupled to the battery terminals 218, the BMS-control module 204, and the battery cells 206.

The battery cells 206 are coupled to the switch 208 and the BMS-power module 202 at a first connection, are coupled to the second battery terminal 218b at a second connection, and are configured to be communicatively coupled to the BMS-control module 204. The BMS-control module 204 is coupled to the BMS-power module 202, the battery cells 206, and the switch 208. The BMS-control module 204 may be communicatively and/or electrically coupled to the foregoing components.

The battery module 104a is configured to receive power from a power device, such as the power device 102, via the battery terminals 218. For example, the battery module 104a may be configured to receive power from the power device 102 to recharge the battery cells 206 where a current SOC of the battery cells 206 is below a target SOC, as discussed in greater detail below.

In some examples, the battery module 104a may also be configured to discharge power to a power device, such as the power device 102, via the battery terminals 218. As discussed above, the battery module 104a may be considered to "operate with" a power device if the battery module 104a discharges power to the power device. Accordingly, the battery module 104a may not be considered to operate with a recharging device (for example, used in a storage warehouse to recharge the battery module 104a) if the battery module 104a is not configured to discharge power to the recharging device. Conversely, the battery module 104a may be considered to operate with a power device to which the battery module 104a is coupled if the battery module 104a discharges stored power to the power device.

In addition to providing power to and/or receiving power from the power device via the battery terminals 218, the battery cells 206 may be configured to discharge stored power to the BMS-power module 202 and/or the BMS-control module 204. For example, the battery cells 206 may discharge stored power to the LPS 210. The LPS 210 may provide power to components of the battery module 104a, including components of the BMS 200. In some examples, the BMS 200 may receive at least some power from the battery cells 206 and/or an external power supply (for example, via the battery terminals 218) directly.

The switch 208 may include one or more switching devices, such as FETs, BJTs, relays, and so forth. The switch 208 may be controlled by the BMS 200, such as the controller 214. For example, the switch 208 may include a control terminal, such as a gate connection, coupled to the controller 214. The controller 214 may control a state of the switch 208 by providing control signals to the control terminal of the switch 208. In other examples, the controller 214 may control a state of the switch through alternate and/or additional means.

In some examples, the controller 214 operates the switch 208 to provide a main charging current to the battery cells 206 via the switch 208, and may modulate the main charging current by controlling the state of the switch 208. In other examples, the battery module 104a may include a separate charger (not illustrated) configured to provide the main charging current to the battery cells 206. The switch 208 may act as an electrical disconnect but may or may not play a role in modulating a charging current where a charger is implemented.

The charger 212 may be configured to provide a charging current to the battery cells 206. In some examples, the charger 212 may provide a trickle-charging current. For example, the charger 212 may charge the battery cells 206 where the SOC of the battery cells 206 is at or near a target SOC (for example, 100%). The charger 212 may charge the battery cells 206 using power derived from the battery terminals 218 directly, rather than via the switch 208 or another main charger. In various examples, the battery module 104a may also receive a charging current (for example, a larger charging current) from an external charging device via the battery terminals 218 to charge the battery cells 206 directly The controller 214 may control one or more components of the battery module 104a, including the switch 208, LPS 210, charger 212, and/or interface 216. The controller 214 may further include or be coupled to one or more sensors (for example, voltage sensors, current sensors, temperature sensors, and so forth) to receive sensor information indicative of sensed properties, such as voltage, current, temperature, and so forth. For example, the battery cells 206 may include or be coupled to one or more voltage, current, and/or temperature sensors, and the controller 214 may be communicatively coupled to the sensors to receive voltage, current, and/or temperature information relating to the battery cells 206. The controller 214 may be configured to determine additional information based on the received sensor information. For example, the controller 214 may be configured to determine a present SOC of the battery cells 206 based at least in part on sensed voltage and/or current information. In other examples, additional or different sensors may be implemented.

The interface 216 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as a power device coupled to the battery terminals 218, or other entities, such as human beings. Other systems with which the battery module 104a may communicate may include any device, component, module, and so forth, such as a server, database, laptop computer, desktop computer, tablet computer, smartphone, central controller or data-aggregation system, other energy-storage devices (for example, the other energy-storage devices 104), and so forth.

Figure 3:
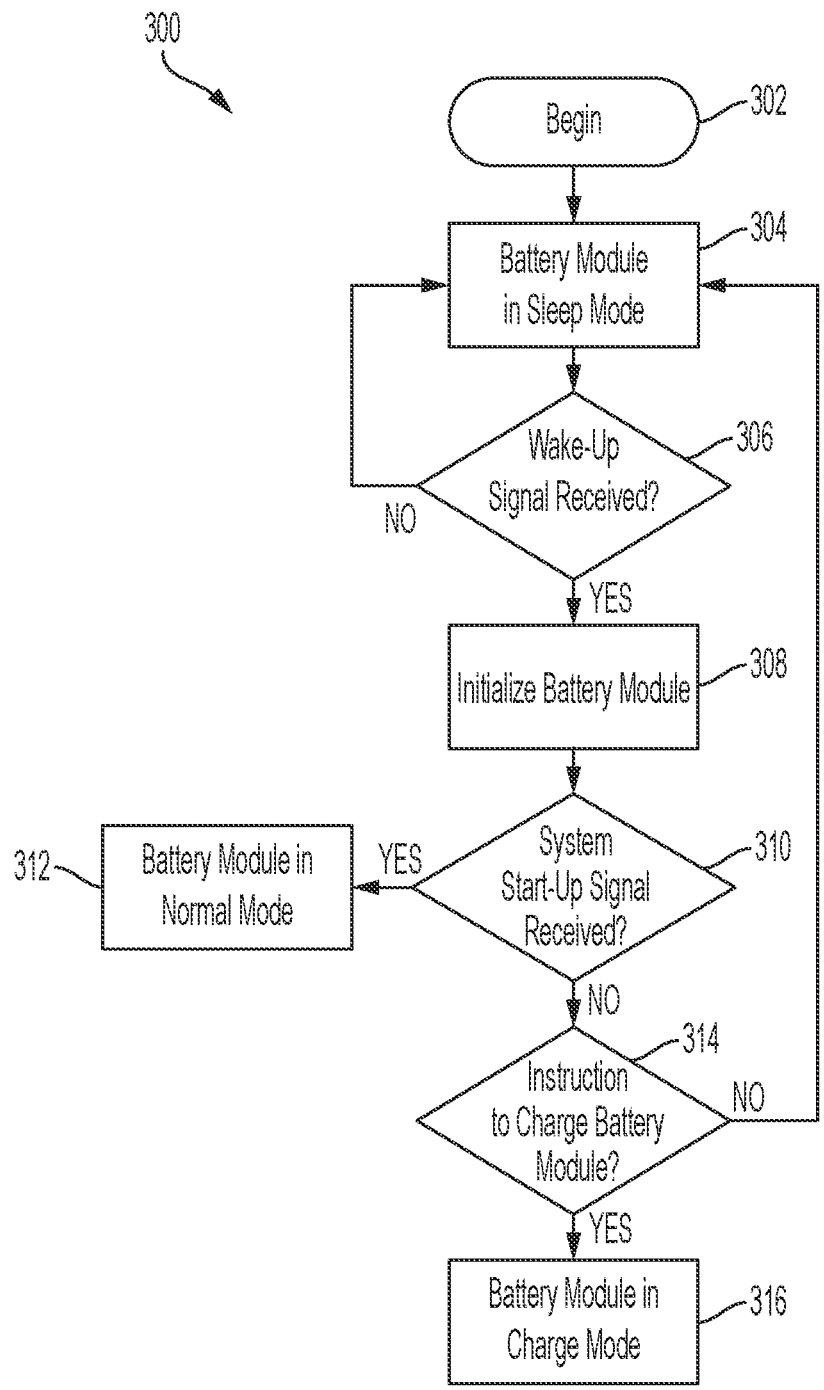
FIG. 3 illustrates a process of operating an energy-storage device according to an example.

A process of operating the battery module 104a in accordance with these principles is provided with respect to FIG. 3.

FIG. 3 illustrates a process of controlling an energy-storage device according to an example. For example, the process 300 may be a process of controlling the battery module 104a. For purposes of example, the process 300 begins with the battery module 104a being in a sleep mode.

At act 302, the process 300 begins.

At act 304, the battery module 104a is in a sleep mode. The sleep mode may be a low-power mode of operation in which certain functionality of the battery module 104a is deactivated or placed in a lower-power-consumption state. For example, where the interface 216 includes a user interface such as a display screen, the display screen may be powered off. The sleep mode may be implemented where the battery module 104a is not expected to be used for extended periods of time, such that reducing power consumption is advantageous. Power consumption (for example, from the battery cells 206, which may provide power to the battery module 104a while in the sleep mode) may therefore be minimized. For example, while the battery module 104a is kept in storage for later distribution, the battery module 104a may be in the sleep mode. Examples of entering the sleep mode are provided below.

At act 306, the battery module 104a determines whether a wake-up signal has been received. For example, the controller 214 may determine whether a wake-up signal has been received from a user or other entity, such as a power device. The wake-up signal may be received via the interface 216. For example, the interface 216 may include a wired and/or wireless communication interface configured to interface with a power device, such as the power device 102. The wake-up signal may be sent by the power device 102 when the power device 102 is initially connected to the battery terminals 218. For example, the wake-up signal may be sent to prepare the battery module 104a to determine whether the battery module 104a should be recharged, to determine whether the battery module 104a should operate with a connected power device, and so forth.

If the battery module 104a determines that no wake-up signal has been received (306 NO), then the process 300 returns to act 304. Otherwise, if the battery module 104a determines that a wake-up signal has been received (306 YES), then the process 300 continues to act 308.

At act 308, the battery module 104a is initialized. For example, the battery module 104a may control components that are deactivated or in a lower-power-consumption state associated with the sleep mode to awaken. Continuing with the example above, the controller 214 may control the user interface to be powered on and begin displaying information. It is to be appreciated that additional functionality may be activated, such as by activating components of the charger 212, other components of the interface 216, and so forth. The controller 214 may be configured to check one or more parameters during initialization, such as by confirming that a voltage at the battery terminals 218 is within an acceptable voltage range (for example, 170-220V), confirming that an ambient temperature is within an acceptable temperature range, and so forth. In various examples, the controller 214 may control the battery module 104a to return to the sleep mode if the one or more parameters are not of a desired value.

At act 310, the battery module 104a determines whether a system start-up signal has been received. The system start-up signal, if received, may be received at the interface 216. For example, the system start-up signal may be a wired or wireless communication signal provided to a communication interface of the interface 216. The system start-up signal may be sent by a power device that the battery module 104a is configured to operate with, such as a UPS. The system start-up signal may be a command to operate with the power device and may be a command for the battery module 104a to enter the normal mode of operation. In various examples, such power devices may be configured to communicate the system start-up signal to battery modules that are connected to the power devices. Conversely, power devices that the battery module 104a is not configured to operate with, such as certain recharging devices, may not be configured to communicate a system start-up signal to the battery module 104a. In some examples, the battery module 104a may wait a threshold amount of time to receive the system start-up signal before determining whether or not the system start-up signal has been received. If the system start-up signal has been received (310 YES), then the process 300 continues to act 312.

At act 312, the battery module 104a operates in a normal mode. In the normal mode, the battery module 104a is configured to discharge power to a connected power device as needed and, in some examples, receive recharging power from the connected power device. For example, the battery module 104a may be charged to approximately 100% SOC while in the normal mode. Accordingly, it is to be appreciated that although reference is made herein to a charge mode, the battery module 104a may be charged in modes of operation other than the charge mode. In various examples, one difference between the modes of operation may be that the battery module 104a may be charged to 100% in the normal mode, and may be charged to a lower SOC (for example, 30% SOC) in the charge mode. Examples of the normal mode are provided in greater detail below with respect to FIG. 5.

Otherwise, if the system start-up signal has not been received (310 NO), then the process 300 continues to act 314. For example, the battery module 104a may not receive the system start-up signal if the battery module 104a has received a wake-up signal from a power device that may be capable of recharging the battery module 104a, but which the battery module 104a is not configured to operate with.

At act 314, the battery module 104a determines whether an instruction has been received to charge the battery module 104a. The instruction may be received at the interface 216 from a power device, such as the power device 102, in some examples. The instruction may indicate an availability of charging power. For example, the battery module 104a may confirm that the power device that sent the wake-up signal at act 306 is capable of charging the battery module 104a. It is to be appreciated that in some examples, act 314 may include determining whether any information has been received from the power device indicating that charging power is available, and may not be an instruction. In some examples, the instruction may indicate a target, maximum, and/or minimum SOC to which to charge the battery module 104a using power derived from the power device. In other examples, act 314 may be optional and may not be executed.

If no instruction has been received indicating that the battery module 104a is to be, or can be, charged (314 NO), then the process 300 returns to act 304. Otherwise, if an instruction has been received indicating that the battery module 104a is to be, or can be, charged (314 YES), then the process 300 continues to act 316.

At act 316, the battery module 104a is put in a charge mode. For example, the controller 214 may control the battery module 104a to be in the charge mode. As discussed above, in some examples a difference between the normal mode and the charge mode may be that a lower SOC target is implemented in the charge mode. However, the battery module 104a may be charged in modes of operation other than the charge mode. An example of the charge mode is provided with respect to FIG. 4.

Figure 4:
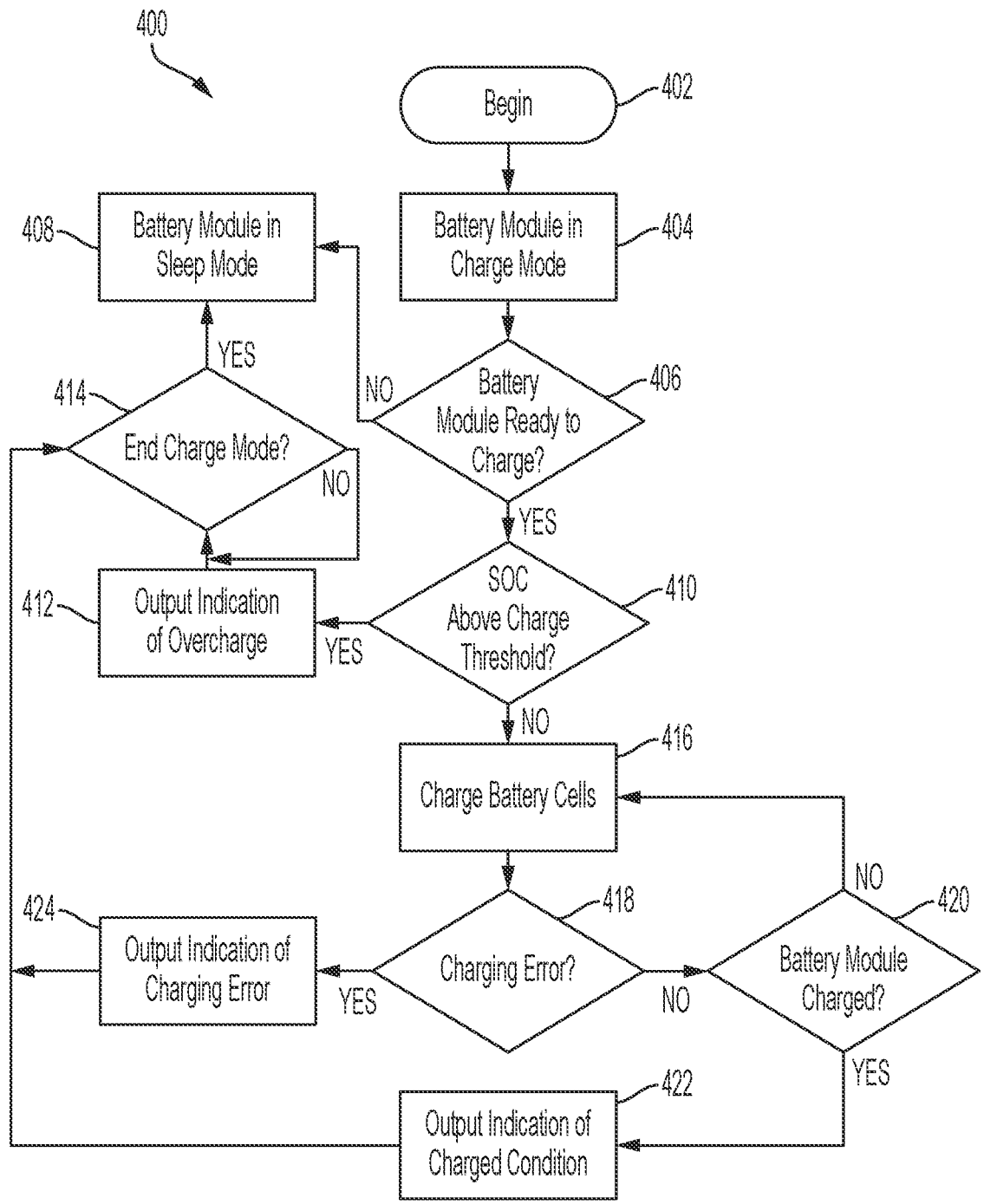
FIG. 4 illustrates a process of operating an energy-storage device according to an example.

FIG. 4 illustrates a process 400 of controlling the battery module 104a to operate in a charge mode according to an example. It is to be appreciated that the battery module 104a may be charged in modes of operation other than the charge mode, such as the normal mode. In various examples, the charge mode may be a mode of operation in which the battery module 104a is charged to a threshold SOC that is less than 100%.

At act 402, the process 400 begins.

At act 404, the battery module 104a is in the charge mode. The controller 214 controls the battery module 104a to be in the charge mode. As discussed above, the process 400 may be initiated responsive to the battery module 104a being put in the charge mode at act 316.

At act 406, the battery module 104a determines if the battery module 104a is ready to be charged. For example, the battery module 104a may confirm that adequate charging power is available at the battery terminals 218 from the power device 102. In one example, the controller 214 may determine a voltage across the battery terminals 218 and determine whether the voltage is within an acceptable range of battery-bus voltage values, such as a range of 170-220 V. In one example, the controller 214 may be coupled to one or more voltage sensors configured to provide information indicative of the voltage across the battery terminals 218. In another example, the controller 214 may receive voltage information indicative of the voltage across the battery terminals 218 from one or more components or devices, such as the power device 102, via the interface 216. Act 406 may include determining additional and/or different conditions indicative of the battery module 104a's readiness to be charged in various examples.

If the battery module 104a is not ready to be charged (406 NO), then the process 400 continues to act 408. For example, the battery module 104a may not be ready to be charged if charging power is unavailable to charge the battery module 104a.

At act 408, the battery module 104a is put in the sleep mode. As discussed above, the process 300 may provide an example of operations performed by the battery module 104a while in the sleep mode.

Otherwise, if the battery module 104a is ready to be charged (406 YES), then the process 400 continues to act 410.

At act 410, the battery module 104a determines whether a present SOC of the battery module 104a (for example, of the battery cells 206) is above a threshold SOC. The controller 214 may be coupled to one or more sensing devices configured to determine a present SOC of the battery cells 206. In one example, the battery cells 206 may include one or more voltage and/or current sensors configured to provide information indicative of a current SOC of the battery cells 206, such as a present voltage across terminals of the battery cells 206, to the controller 214.

The threshold SOC may indicate a maximum SOC that the battery cells 206 are not to exceed. In some examples, the controller 214 may receive information indicative of the threshold SOC from the power device 102 via the interfaces 216, such as at act 314 as discussed above. In other examples, the controller 214 may access locally stored information indicative of one or more threshold SOCs. For example, the controller 214 may include or be coupled to one or more memory and/or storage components configured to store the information indicative of the one or more threshold SOCs. For purposes of example, a threshold SOC may be, for example, 30%.

If the current SOC of the battery module 104a is above the threshold SOC (410 YES), then the process 400 continues to act 412.

At act 412, the controller 214 determines that the battery module 104a is overcharged and outputs an indication of the overcharge condition. For example, where the interface 216 includes a user interface, the controller 214 may control the interface 216 to output the indication of the overcharge condition to a user, such as by displaying information on a screen, playing an audible sound, illuminating a light-emitting diode (LED), and so forth. Illuminating an LED may include, for example, controlling an LED to slowly flash red. In another example, where the interface 216 includes a communication interface, the controller 214 may control the interface 216 to provide information indicative of the overcharge condition to one or more devices, such as a user device operated by user (for example, a smartphone) in addition to or in lieu of controlling a user interface to display the information.

At act 414, the controller 214 determines whether to end the charge mode of operation. The controller 214 may end the charge mode of operation responsive to detecting one or more end-of-charging conditions, which may include fault conditions and/or one or more conditions indicating that charging is complete. The controller 214 may determine if any of several end-of-charging conditions has been detected, such as by determining that the power device 102 has been disconnected from the battery module 104*a*, determining that a current SOC of the battery module 104*a* has fallen below a minimum SOC (for example, 25% SOC), determining that a threshold amount of time has elapsed (for example, since act 410 was executed, since the battery module 104*a* was initially connected to the power device 102, and so forth), or other end-of-charging conditions. If no end-of-charging condition is detected (414 NO), then act 414 is repeatedly executed until an end-of-charging condition is detected, as discussed in greater detail below.

Returning to act 410, if the current SOC is not above the threshold SOC (410 NO), then the process 400 continues to act 416.

At act 416, the controller 214 controls the battery module 104*a* to charge the battery cells 206. For example, the controller 214 may control the switch 208 to be in a closed and conducting position to couple the first battery terminal 218*a* to the battery cells 206. In some examples, the controller 214 may regulate the charging power received from the first battery terminal 218*a* by controlling a state of the switch 208. In some examples, the controller 214 may provide an indication of the charging state. For example, where the interface 216 includes an LED, the controller 214 may control the LED to slowly flash green indicating that the battery cells 206 are being charged.

At act 418, the controller 214 determines whether any charging error has occurred. It is to be appreciated that act 418 may be executed while act 416 is still being executed, that is, while the battery cells 206 are still being charged. A charging error may include, for example, an overvoltage or undervoltage at the battery terminals. An undervoltage (for example, less than 25 V across the battery terminals 218) may be indicative of the power device 102 being disconnected from the battery terminals 218 or otherwise not being able to provide charging power. An overvoltage (for example, greater than 220 V across the battery terminals 218) may be indicative of the power device 102 being unable to provide a rated charging power. If no charging error is detected (418 NO), the process 400 continues to act 420.

At act 420, the controller 214 determines whether the battery cells 206 are charged. Determining whether the battery cells 206 are charged may include determining whether a current SOC of the battery cells 206 is at a desired SOC or voltage value or within a desired SOC or voltage range indicating that the battery cells 206 have a desired level of charge. In one example, a desired level of charge may be the threshold SOC discussed above with respect to act 410, such as 30%. In other examples, the desired level of charge may be related to the threshold SOC but not equal to the threshold SOC, and in other examples, the desired level of charge may not be related to the threshold SOC.

If the controller 214 determines that the battery cells 206 are not charged yet (420 NO), then the process 400 returns to act 416. The controller 214 continues to charge the battery cells 206 until a charging error is detected (418 YES) or the battery module 104*a* is charged (420 YES). If the controller 214 determines that the battery module 104*a* is charged (420 YES), then the process 400 continues to act 422.

At act 422, the controller 214 outputs an indication of the charged condition of the battery cells 206. The controller 214 may control the interface 216 to output the indication of the charged condition. For example, where the interface 216 includes an LED, the controller 214 may control the LED to output a steady green light. In this example, the steady green light may indicate that the battery cells 206 are charged to the desired level. The controller 214 may also control the battery module 104*a* to stop receiving charging power from the battery terminals 218, such as by opening the switch 208. In some examples, the controller 214 may control the battery module 104*a* to continue to provide a small current to the battery cells 206, such as by controlling the charger 212 to provide a charging current derived from the battery terminals 218 to the battery cells 206. The process 400 then continues to act 414.

Returning to act 418, if a charging error is detected before the battery cells 206 are charged (418 YES), then the process 400 continues to act 424.

At act 424, the controller 214 outputs an indication of the charging error. The controller 214 may control the interface 216 to output the indication of the charging error. For example, where the interface 216 includes an LED, the controller 214 may control the LED to quickly flash red. The process 400 then continues to act 414.

As discussed above, at act 414, the controller 214 determines whether an end-of-charging condition has been detected. If an end-of-charging condition is detected (414 YES), then the process 400 continues to act 408.

At act 408, the controller 214 turns off components of the battery module 104*a*. For example, the controller 214 may control components of the battery module 104*a* to be deactivated or to enter a lower-power-consumption state to prepare to be in a sleep mode of operation. Accordingly, the controller 214 may deactivate functionality of the battery module 104*a* that may not be needed while the battery module 104*a* is in the sleep mode of operation. The controller 214 then puts the battery module 104*a* in the sleep mode of operation as discussed above.

An example of the processes 300, 400 is provided to illustrate the foregoing principles. An example is provided in which a battery module is stored in a warehouse awaiting distribution to a user or customer. An individual in the warehouse may periodically connect the battery module to a power device configured to recharge the battery module to a threshold SOC. While in storage, the threshold SOC may be less than a maximum storage capacity of the battery module pursuant to applicable regulations. In this example, the threshold SOC may be 30%.

While the battery module is being stored, the battery module may remain in the sleep mode of operation to minimize power lost while awaiting distribution (act 304). The individual in the warehouse then connects the battery module to a power device that is configured to recharge the battery module. The power device communicates a wake-up signal to the battery module when the power device is connected to the battery module (act 306 YES). The battery module is initialized to prepare for charging responsive to receiving the wake-up signal (act 308).

The battery module determines that no system start-up signal is received from the power device (310 NO). As discussed above, the battery module may receive a system start-up signal from a power device that the battery module is configured to operate with, such as a UPS. If no start-up signal is received, this may indicate to the battery module that the battery module is not yet being implemented for normal operation with a user, and that the battery module may instead still be in storage awaiting distribution.

The battery module may thus determine that a lower SOC threshold is to be implemented pursuant to regulatory requirements. Because the power device is configured to recharge the battery module, but not receive discharged power from the battery module, the power device does not send a system start-up signal to the battery module. However, the power device sends an instruction to charge the battery module using power derived from the power device (act 314). The battery module is thus put in the charge mode (acts 316, 404).

The battery module determines whether the battery module is ready to be charged by the power device (act 406). If adequate charging power is not available from the power device, such as by determining that a voltage across the battery terminals of the battery module is not within a specified range (for example, 170-220 V) (act 406 NO), then the battery module is put back into the sleep mode (act 408). If adequate charging power is available from the power device (act 406 YES), then the battery module determines whether a current SOC of the battery module is above a threshold SOC (act 410).

For example, the battery module may determine a voltage across the terminals of its battery cells to determine a current SOC of the battery module. If the current SOC is greater than the example threshold SOC of 30% (act 410 YES), then the battery module outputs an indication of being overcharged (act 412). For example, the battery module may control an LED on the battery module to slowly flash red. The battery module then monitors for an end-of-charging condition (act 414).

Otherwise, if the current SOC is equal to or less than 30% (act 410 NO), then the battery module begins recharging its battery cells using power derived from the power device (act 416). While the battery module is recharged, the battery module monitors for charging errors (act 418) and monitors its current SOC to determine whether the battery module is sufficiently recharged (act 420), such as by determining whether its current SOC is equal to or greater than 30%. While the battery module is recharged, the battery module may control an LED to slowly flash green. If any charging errors are detected (418 YES), then the battery module may output an indication of the charging error (424), such as by controlling an LED to quickly flash red.

A charging error may be detected if the voltage across the battery terminals coupled to the power device fall above or below an acceptable-voltage range (for example, 170-220V), which may indicate an undervoltage or overvoltage condition of the power device. Otherwise, if no charging errors are detected and the battery module is sufficiently recharged (act 420 YES), the battery module outputs an indication that the battery module is charged (act 422). For example, the battery module may control an LED to output a steady green light indicating that charging is complete.

Whether the battery module is sufficiently recharged (act 420 YES), a charging error is detected (act 418 YES), or the battery module was overcharged to begin with (410 YES), the battery module may be outputting an indication of a current status of the battery module (acts 412, 422, 424) while monitoring for an end-of-charging condition. For example, the battery module may be waiting for a user to take action based on the indication of the current status of the battery module, whether overcharged (as indicated, for example, by a slowly flashing red light), sufficiently charged (as indicated, for example, by a solid green light), or having experienced a charging error (as indicated, for example, by a quickly flashing red light). The battery module may await a user disconnecting the battery module from the power device, for example, for subsequent handling based on the current status of the battery module.

The end-of-charging conditions may indicate that the battery module has been disconnected from the power device. For example, the battery module may detect disconnection from the power device by detecting an undervoltage condition at the battery terminals configured to be connected to the power device. If the power device is not connected to the battery terminals any longer, the voltage across the battery terminals may drop below a lower threshold. Thus, an end-of-charging condition may be the voltage across the battery terminals dropping below 25 V, which may indicate that a user has disconnected the battery module from the power device.

Another end-of-charging condition may indicate that the battery module has been connected for too long to the power device. For example, the battery module may determine that a threshold period of time has elapsed (for example, days, weeks, months, and so forth) since being coupled to the power device and that a user has thus likely forgotten about the battery module. In another example, the battery module may determine that a current SOC of the battery module has fallen below a lower SOC threshold (for example, 25%), indicating that the battery module has been forgotten long enough for the SOC of the battery module to degrade below the lower SOC threshold.

If the battery module detects an end-of-charging condition (act 414 YES), which may indicate that a user has disconnected the battery module from the power device or that the user has likely forgotten about the battery module, the battery module prepares to enter a sleep mode by disabling certain functionality of the battery module (act 408). For example, the battery module may disable certain communication and/or interface functionality. The battery module then enters the sleep mode.

The battery module may be stored in the warehouse for an extended period of time and may be periodically reconnected to a recharging power device in this manner several times over the course of days, weeks, months, or years. Eventually, the battery module may be shipped from the warehouse to an end user to operate the battery module. For example, the end user may connect the battery module to a UPS operated by the user to provide back-up power to the UPS.

Upon being coupled to the UPS, the battery module receives a wake-up signal from the UPS (act 306 YES). The battery module is initialized as discussed above (act 308). The UPS communicates a system start-up signal to the battery module (act 310 YES). As discussed above, the UPS may be pre-programmed to send the system start-up signal to a connected battery module in some examples. The battery module then enters a normal mode of operation responsive to determining, based on receiving the system start-up signal, that the battery module is to operate with the UPS.

As discussed above, operating with a power device such as a UPS may include discharging power to (and, in some examples, receiving charging power from) the power device. The operations performed by the battery module in the normal mode may depend on a type of power device to which the battery module is connected. In various examples of the normal mode, however, the battery module is not subject to a maximum-SOC limit. Accordingly, the battery module may be recharged to 100% where charging power is available, rather than stopping charging at a lower SOC threshold, such as 30%. An example of operating the battery module 104*a* in the normal mode where the power device 102 is implemented as a UPS is provided with respect to FIG. 5.

Figure 5:
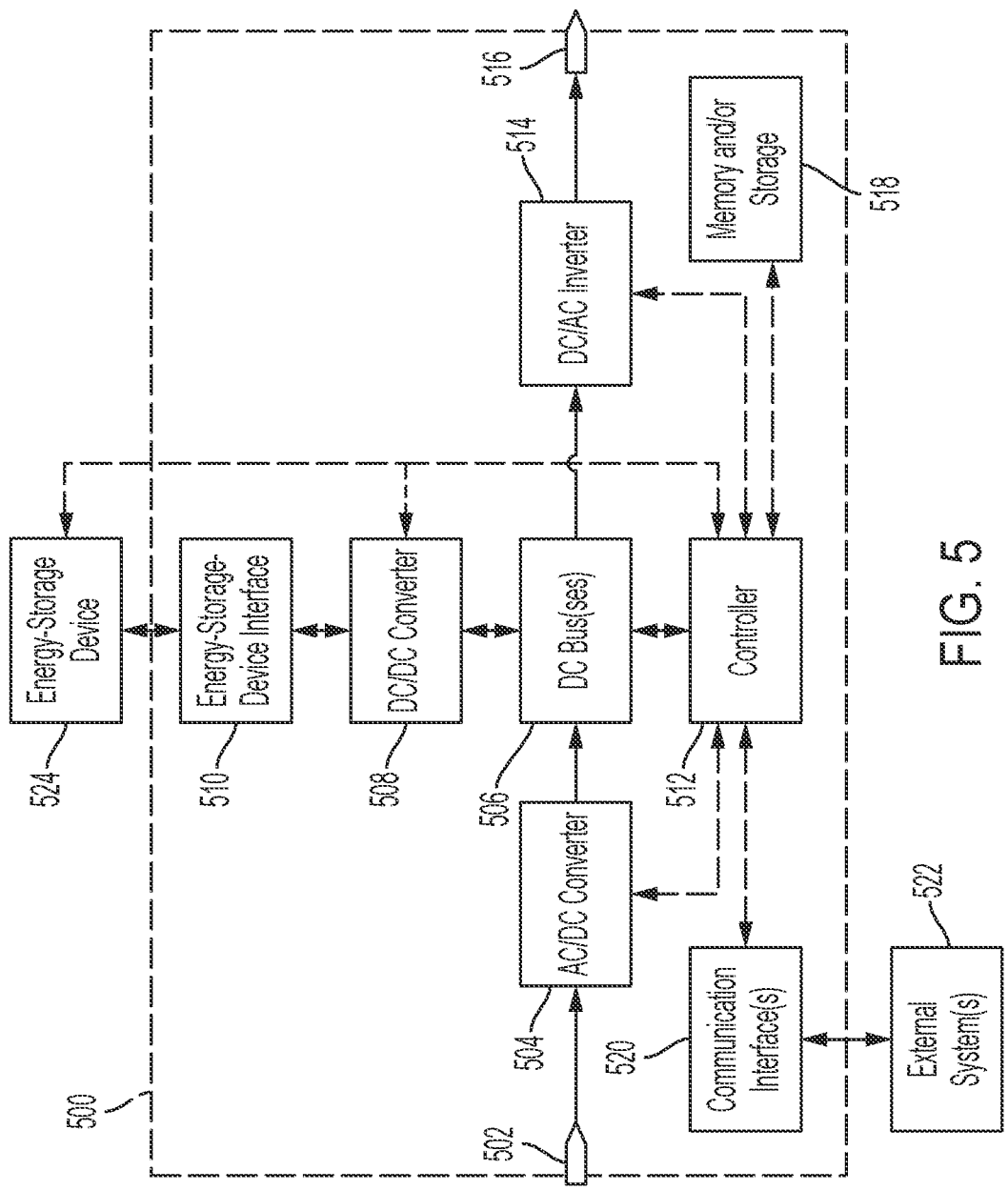
FIG. 5 illustrates a block diagram of an uninterruptible power supply according to an example.

FIG. 5 is a block diagram of a UPS 500. For example, the UPS 500 may be an example of the power device 102. The UPS 500 includes an input 502, an AC/DC converter 504, one or more DC busses 506, a DC/DC converter 508, an energy-storage-device interface 510, at least one controller 512 ("controller 512"), a DC/AC inverter 514, an output 516, a memory and/or storage 518, and one or more communication interfaces 520 ("communication interfaces 520"), which may be communicatively coupled to one or more external systems 522 ("external systems 522"). The input 502 is coupled to the AC/DC converter 504 and to an AC power source (not pictured), such as an AC mains power supply. The AC/DC converter 504 is coupled to the input 502 and to the one or more DC busses 506, and is communicatively coupled to the controller 512. The one or more DC busses 506 are coupled to the AC/DC converter 504, the DC/DC converter 508, and to the DC/AC inverter 514, and are communicatively coupled to the controller 512. The DC/DC converter 508 is coupled to the one or more DC busses 506 and to the energy-storage-device interface 510, and is communicatively coupled to the controller 512.

The energy-storage-device interface 510 is coupled to the DC/DC converter 508, and is configured to be coupled to at least one energy-storage device 524 and/or another energy-storage device. In some examples, the UPS 500 may include one or more energy-storage devices, which may include the energy-storage device 524. In various examples, the energy-storage device 524 may include one or more batteries, capacitors, flywheels, or other energy-storage devices.

For example, the energy-storage device 524 may be implemented as the battery module 104a. The battery module 104a may be coupled to the energy-storage-device interface 510 via the battery terminals 218 to exchange power with the UPS 500. The battery module 104a may be communicatively coupled to the communication interfaces 520 via the interfaces 216 to send and/or receive information from the UPS 500. For example, the interfaces 216 may include a controller area network (CAN) interface, and the battery module 104a may be communicatively coupled to the UPS 500 via a CAN connection. In some examples, a position of the battery terminals 218 and at least one interface (for example, a CAN interface) of the interfaces 216 may be aligned with a position of the DC/DC converter 508 and at least one of the communication interfaces 520, respectively, such that coupling the battery module 104a to the UPS 500 enables both an electrical and communicative connection to be established upon coupling.

The DC/AC inverter 514 is coupled to the one or more DC busses 506 and to the output 516, and is communicatively coupled to the controller 512. The output 516 is coupled to the DC/AC inverter 514, and to an external load (not pictured). The controller 512 is communicatively coupled to the AC/DC converter 504, the one or more DC busses 506, the DC/DC converter 508, the energy-storage-device interface 510, the DC/AC inverter 514, the memory and/or storage 518, and the communication interfaces 520.

The input 502 is configured to be coupled to an AC mains power source and to receive input AC power having an input voltage level. The UPS 500 is configured to operate in different modes of operation based on the input voltage of the AC power provided to the input 502. The controller 512 may determine a mode of operation in which to operate the UPS 500 based on whether the input voltage of the AC power is acceptable. The controller 512 may include or be coupled to one or more sensors configured to sense parameters of the input voltage. For example, the controller 512 may include or be coupled to one or more sensors configured to sense a voltage level of the AC power received at the input 502.

When AC power provided to the input 502 is acceptable (for example, by having parameters, such as an input voltage value, that meet specified values, such as by falling within a range of acceptable input voltage values), the controller 512 controls components of the UPS 500 to operate in a mains mode of operation. In the mains mode of operation, AC power received at the input 502 is provided to the AC/DC converter 504. The AC/DC converter 504 converts the AC power into DC power and provides the DC power to the one or more DC busses 506. The one or more DC busses 506 distribute the DC power to the DC/DC converter 508 and to the DC/AC inverter 514. The DC/DC converter 508 converts the received DC power and provides the converted DC power to the energy-storage-device interface 510. The energy-storage-device interface 510 receives the converted DC power, and provides the converted DC power to the energy-storage device 524 to charge the energy-storage device 524. The DC/AC inverter 514 receives DC power from the one or more DC busses 506, converts the DC power into regulated AC power, and provides the regulated AC power to the output 516 to be delivered to a load.

When AC power provided to the input 502 from the AC mains power source is not acceptable (for example, by having parameters, such as an input voltage value, that do not meet specified values, such as by falling outside of a range of acceptable input voltage values), the controller 512 controls components of the UPS 500 to operate in a backup mode of operation. In the backup mode of operation, DC power is discharged from the energy-storage device 524 to the energy-storage-device interface 510, and the energy-storage-device interface 510 provides the discharged DC power to the DC/DC converter 508. The DC/DC converter 508 converts the received DC power and distributes the DC power amongst the one or more DC busses 506. For example, the DC/DC converter 508 may evenly distribute the power amongst the one or more DC busses 506. The one or more DC busses 506 provide the received power to the DC/AC inverter 514. The DC/AC inverter 514 receives the DC power from the one or more DC busses 506, converts the DC power into regulated AC power, and provides the regulated AC power to the output 516.

The controller 512 may store information in, and/or retrieve information from, the memory and/or storage 518. For example, the controller 512 may store information indicative of sensed parameters (for example, input-voltage values of the AC power received at the input 502) in the memory and/or storage 518. The controller 512 may further receive information from, or provide information to, the communication interfaces 520. The communication interfaces 520 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 522, or other entities, such as human beings. The external systems 522 may include any device, component, module, and so forth, that is external to the UPS 500, such as a server, database, laptop computer, desktop computer, tablet computer, smartphone, central controller or data-aggregation system, other UPSs, and so forth.

In some examples, a power device such as the UPS 500 may provide DC power to the battery module 104*a* via the battery terminals 218. In other examples, a power device may provide AC power to the battery module 104*a*. The battery module 104*a* may include one or more power-conversion components to convert the input power as necessary, such as an AC-to-DC converter configured to convert input AC power to DC power.

Examples have been provided for purposes of explanation in which an energy-storage device implements a lower SOC threshold, such as 30%, while in storage and/or shipment. In some examples, other SOC thresholds may be implemented and may be correlated to situations other than storage and/or shipment, such as situations in which it may be desirable to implement an SOC threshold that is less than 100%. Moreover, it is to be appreciated that example SOC-threshold values, such as 30%, are provided for purposes of example only.

As discussed above, the battery module 104*a* may enter the normal mode responsive to being connected to a power device that the battery module 104*a* is configured to operate with, such as the UPS 500. In some examples, the battery module 104*a* may be configured to remain in the normal mode for the remainder of the battery module 104*a*'s life. In other examples, the battery module 104*a* may be configured to transition to other modes of operation, such as the sleep mode or charge mode. For example, if the battery module 104*a* is disconnected from a power device for a certain threshold period of time, the battery module 104*a* may transition to a sleep mode of operation.

Additional modes of operation of the battery module 104*a* may be implemented in various examples. For example, the battery module 104*a* may be configured to operate in an off mode of operation. The interface 216 may include one or more user-interface elements such as push buttons, flip switches, dials, rocker switches, and so forth, to enable the battery module 104*a* to be turned on or off. For example, the interface 216 may include an on/off button. In various examples, the battery module 104*a* may only be capable of entering the modes of operation discussed above, including the normal mode, charge mode, and sleep mode, if the on/off button is switched to an on position. Otherwise, if the on/off button is in the off position, the battery module 104*a* may deactivate substantially all functionality and be completely powered off.

Various controllers, such as the controllers 214, 512 may execute various operations discussed above. Using data stored in associated memory and/or storage, the controllers 214, 512 may also execute one or more instructions stored on one or more non-transitory computer-readable media, which the controllers 214, 512 may include and/or be coupled to, that may result in manipulated data. In some examples, the controllers 214, 512 may include one or more processors or other types of controllers. In one example, the controllers 214, 512 are or include at least one processor. In another example, the controllers 214, 512 perform at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

In various examples, a battery module, such as the battery module 104*a*, may be assembled for distribution. Assembling the battery module 104*a* may include providing battery terminals to be coupled to a power device (for example, providing the battery terminals 218 to be coupled to the power device 102), providing one or more battery cells to store energy (for example, providing the battery cells 206), and providing a BMS (for example, providing the BMS 200). The BMS may be configured to determine whether a command to operate with the power device has been received (for example, as discussed above at act 310), charge, responsive to determining that a command to operate with the power device has not been received, the one or more battery cells to a first state of charge with power derived from the power device (for example, as discussed above at act 416), and charge, responsive to determining that a command to operate with the power device has been received, the one or more battery cells to a second state of charge with power derived from the power device, the second state of charge being greater than the first state of charge (for example, as discussed above with respect to act 312 and FIG. 5). The assembly may further include coupling the battery terminals to the one or more battery cells (for example, via the switch 208) and coupling the BMS to the one or more battery cells.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A battery module comprising:
   battery terminals configured to be coupled to at least one power device;
   one or more battery cells configured to store energy; and
   a battery-management system configured to:
      determine whether a command to operate with the at least one power device has been received;
      charge, responsive to determining that a command to operate with a first power device has not been received, the one or more battery cells to a first state of charge with power derived from the first power device; and
      charge, responsive to determining that a command to operate with a second power device has been received, the one or more battery cells to a second state of charge with power derived from the second power device, the second state of charge being greater than the first state of charge.

2. The battery module of claim 1, wherein the command to operate with the second power device is received from the second power device and includes a command to enter a normal mode of operation.

3. The battery module of claim 2, wherein the battery-management system is further configured to:
   enter, responsive to receiving the command to enter the normal mode of operation, the normal mode of operation; and
   control, in the normal mode of operation, the one or more battery cells to discharge power to the second power device.

4. The battery module of claim 1, wherein the battery-management system is configured to:
control the battery module to be in a sleep mode of operation; and
receive, in the sleep mode of operation, a wake-up signal from the at least one power device, wherein the battery-management system is configured to determine, responsive to receiving the wake-up signal, whether the command to operate with the at least one power device has been received.

5. The battery module of claim 4, wherein the battery-management system is further configured to determine, responsive to receiving the wake-up signal from the at least one power device, whether a voltage provided by the at least one power device across the battery terminals is within an acceptable voltage range.

6. The battery module of claim 5, wherein the battery-management system is configured to determine that the one or more battery cells are not to be charged responsive to determining that the voltage provided by the at least one power device across the battery terminals is not between the acceptable voltage range.

7. The battery module of claim 4, wherein the battery-management system is further configured to:
determine a voltage provided by the first power device across the battery terminals; and
discontinue, responsive to determining that the voltage provided by the first power device across the battery terminals is not within an acceptable voltage range, charging the one or more battery cells to the first state of charge.

8. The battery module of claim 7, wherein the battery-management system is further configured to control the battery module to enter the sleep mode of operation responsive to determining that the voltage provided by the first power device across the battery terminals is not within an acceptable voltage range.

9. The battery module of claim 4, wherein the battery-management system is further configured to:
determine, responsive to receiving the wake-up signal from the at least one power device, a present state of charge of the one or more battery cells;
determine, responsive to determining that a command to operate with the first power device has not been received, whether the present state of charge of the one or more battery cells exceeds the first state of charge; and
determine that the one or more battery cells are not to be charged responsive to determining that the present state of charge of the one or more battery cells exceeds the first state of charge.

10. The battery module of claim 9, wherein the battery-management system is further configured to:
determine, subsequent to determining that the present state of charge of the one or more battery cells exceeds the first state of charge, whether a state of charge of the one or more battery cells falls below a third state of charge; and
control, responsive to determining that the state of charge of the one or more battery cells falls below the third state of charge, the battery module to be in the sleep mode of operation.

11. A non-transitory computer-readable medium storing thereon sequences of computer-executable instructions for operating a battery module comprising battery terminals configured to be coupled to at least one power device, and one or more battery cells configured to store energy, the sequences of computer-executable instructions including instructions that instruct at least one processor to:
determine whether a command to operate with the at least one power device has been received;
charge, responsive to determining that a command to operate with a first power device has not been received, the one or more battery cells to a first state of charge with power derived from the first power device; and
charge, responsive to determining that a command to operate with a second power device has been received, the one or more battery cells to a second state of charge with power derived from the second power device, the second state of charge being greater than the first state of charge.

12. The non-transitory computer-readable medium of claim 11, wherein the command to operate with the second power device is received from the second power device and includes a command to enter a normal mode of operation.

13. The non-transitory computer-readable medium of claim 12, wherein the instructions further instruct the at least one processor to control the battery module to:
enter, responsive to receiving the command to enter the normal mode of operation, the normal mode of operation; and
control, in the normal mode of operation, the one or more battery cells to discharge power to the second power device.

14. The non-transitory computer-readable medium of claim 11, wherein the instructions further instruct the at least one processor to:
control the battery module to be in a sleep mode of operation; and
receive, in the sleep mode of operation, a wake-up signal from the at least one power device, wherein the instructions instruct the at least one processor to determine, responsive to receiving the wake-up signal, whether the command to operate with the at least one power device has been received.

15. The non-transitory computer-readable medium of claim 14, wherein the instructions further instruct the at least one processor to determine, responsive to receiving the wake-up signal from the at least one power device, whether a voltage provided by the at least one power device across the battery terminals is within an acceptable voltage range.

16. The non-transitory computer-readable medium of claim 15, wherein the instructions further instruct the at least one processor to determine that the one or more battery cells are not to be charged responsive to determining that the voltage provided by the at least one power device across the battery terminals is not between the acceptable voltage range.

17. The non-transitory computer-readable medium of claim 14, wherein the instructions further instruct the at least one processor to:
determine a voltage provided by the first power device across the battery terminals; and
discontinue, responsive to determining that the voltage provided by the first power device across the battery terminals is not within an acceptable voltage range, charging the one or more battery cells to the first state of charge.

18. The non-transitory computer-readable medium of claim 14, wherein the instructions further instruct the at least one processor to:
determine, responsive to receiving the wake-up signal from the first power device, a present state of charge of the one or more battery cells;

determine, responsive to determining that a command to operate with the first power device has not been received, whether the present state of charge of the one or more battery cells exceeds the first state of charge; and determine that the one or more battery cells are not to be charged responsive to determining that the present state of charge of the one or more battery cells exceeds the first state of charge.

19. The non-transitory computer-readable medium of claim 18, wherein the instructions further instruct the at least one processor to:

determine, subsequent to determining that the present state of charge of the one or more battery cells exceeds the first state of charge, whether a state of charge of the one or more battery cells falls below a third state of charge; and control, responsive to determining that the state of charge of the one or more battery cells falls below the third state of charge, the battery module to be in the sleep mode of operation.

20. A method of assembling a battery module, the method comprising:

providing battery terminals configured to be coupled to at least one power device;

providing one or more battery cells configured to store energy; and providing a battery-management system configured to
determine whether a command to operate with the at least one power device has been received,
charge, responsive to determining that a command to operate with a first power device has not been received, the one or more battery cells to a first state of charge with power derived from the first power device, and
charge, responsive to determining that a command to operate with a second power device has been received, the one or more battery cells to a second state of charge with power derived from the second power device, the second state of charge being greater than the first state of charge;

coupling the battery terminals to the one or more battery cells; and coupling the battery-management system to the one or more battery cells.

\* \* \* \* \*